United States Patent [19]
Sekmakas

[11] 3,983,059
[45] *Sept. 28, 1976

[54] EMULSIFIER-FREE AQUEOUS DISPERSION USEFUL IN COATING COMPRISING AMINOPLAST RESIN AND POLYMER OF MONOETHYLENIC CARBOXYLIC ACID PREPARED BY POLYMERIZATION IN THE PRESENCE OF LOW MOLECULAR WEIGHT POLYHYDRIC ALCOHOL

[75] Inventor: Kazys Sekmakas, Chicago, Ill.

[73] Assignee: DeSoto, Inc., Des Plaines, Ill.

[ * ] Notice: The portion of the term of this patent subsequent to Jan. 21, 1992, has been disclaimed.

[22] Filed: Mar. 27, 1975

[21] Appl. No.: 562,952

Related U.S. Application Data

[62] Division of Ser. No. 484,636, July 1, 1974, Pat. No. 3,947,399, which is a division of Ser. No. 258,890, June 1, 1972, Pat. No. 3,862,075.

[52] U.S. Cl. .................. 260/29.4 UA; 260/29.6 E; 260/851; 204/181
[51] Int. Cl.² .................. C08L 61/20; C08L 61/32
[58] Field of Search........ 260/851, 29.4 UA, 22 CB, 260/29.6 E

[56] References Cited
UNITED STATES PATENTS

| | | | |
|---|---|---|---|
| 3,506,601 | 4/1970 | Sekmakas | 260/22 CB |
| 3,527,721 | 9/1970 | Hönel et al. | 260/29.2 UA |
| 3,862,075 | 1/1975 | Sekmakas | 260/29.6 E |
| 3,928,273 | 12/1975 | Chang et al. | 260/851 |

*Primary Examiner*—Joseph L. Schofer
*Assistant Examiner*—Peter F. Kulkosky
*Attorney, Agent, or Firm*—Dressler, Goldsmith, Clement, Gordon, & Shore, Ltd.

[57] ABSTRACT

Monoethylenic monomers, including from about 1 to about 30% by weight of monoethylenic carboxylic acid, are placed in solution in a liquid mixture containing a low molecular weight polyhydric alcohol. This liquid mixture is dispersed in water and polymerized at an elevated polymerization temperature using agitation and in the presence of a free radical polymerization catalyst. The dispersion of polymer particles is then at least partially neutralized, preferably with ammonia or an amine to form an aqueous dispersion which is stable in the absence of emulsifying agent and which is useful in coating.

8 Claims, No Drawings

EMULSIFIER-FREE AQUEOUS DISPERSION USEFUL IN COATING COMPRISING AMINOPLAST RESIN AND POLYMER OF MONOETHYLENIC CARBOXYLIC ACID PREPARED BY POLYMERIZATION IN THE PRESENCE OF LOW MOLECULAR WEIGHT POLYHYDRIC ALCOHOL

The present application is a division of my prior application Ser. No. 484,636, filed July 1, 1974, now U.S. Pat. No. 3,947,399 which, in turn, is a division of my prior application Ser. No. 258,890, filed June 1, 1972, now U.S. Pat. No. 3,862,075.

The present invention relates to stable aqueous dispersions of copolymers of monoethylenic monomers and to the production thereof in the absence of emulsifying agent.

The provision of stable aqueous emulsion coating systems is well known, involving polymerization of monoethylenic monomers in aqueous emulsion to form polymer particles of high molecular weight (50,000 and higher) which are maintained in stable suspension in the aqueous continuum by means of a surface active agent (emulsifying agent) which associates with the particles to maintain them separate from one another during the polymerization, and thereafter.

These known aqueous emulsion systems possess many disadvantages. Thus, the presence of the emulsifier causes a high tendency to foam in use. Also, the high molecular weight, the presence of emulsifier in the final film, and the tendency of the emulsion to form voids and pinholes when deposited and cured all contribute to poor corrosion resistance, making it necessary in practice to apply a film which is thicker than desired to insure adequate protection for the substrate. Also, these emulsions frequently exhibit inadequate rheological performance in coil coating equipment, and clean-up is difficult if the coating material is allowed to dry on the equipment.

In contrast, the aqueous dispersions of this invention involve copolymers of medium molecular weight (10,000–50,000), the foaming tendency is greatly reduced, and the deposited films exhibit good corrosion resistance so that substrates are adequately protected by films which are much thinner than previously needed. Also, coil coating application is very good and the equipment is relatively easy to clean because the coating composition does not dry as easily. Other significant advantages will become apparent from the discussion which follows, it being kept in mind that some of the advantages, such as reduced solvent consumption and superior impact resistance particularly distinguish conventional organic solvent solution application.

To achieve these dispersions, and in this invention, monoethylenic monomers including from about 1 to about 30% by weight of monoethylenic carboxylic acid are placed in solution in a liquid mixture containing a low molecular weight polyhydric alcohol, and the liquid mixture so-obtained is dispersed in water, preferably by incremental addition thereof. The dispersion includes a free radical polymerization catalyst, sometimes termed an initiator, which is preferably dissolved in the water phase of the dispersion. The dispersed liquid mixture is subjected in the dispersion containing the catalyst to agitation at an elevated polymerization temperature until polymerization has been completed to thereby provide a dispersion of copolymer particles in water. It is normally desired to increase the stability of the dispersion to permit prolonged storage and this is done by at least partially neutralizing the copolymer, e.g., by adding a base to react with the acid content of the copolymer. If the copolymer includes amine functionality, then acid, such as acetic acid, can be used for neutralization.

Preferably a nitrogenous base, and most preferably an amine, is added to at least partially neutralize the acid content of the copolymer.

In this way, dispersions stable in the absence of emulsifying agents (surface active agents) are provided, but minor amounts of emulsifying agents can be added without destroying all of the advantages of this invention.

A small amount of volatile organic solvent, such as 2-ethoxy ethanol, may be added to the dispersion to assist particle coalescence on subsequent use, but this frequently is not required and, even when solvent is added, it is usually sufficient to employ less than 10% thereof, based on the weight of copolymer.

It will be noted that the monoethylenic monomers are the materials which are copolymerized and all proportions herein are based on the total weight of such monomers, unless otherwise specified.

In emulsion polymerization, the polymer particles which are formed normally have an average diameter less than 0.5 micron. Here, the particles are larger, normally having an average diameter in the range of 0.5–5 microns. Despite this, the particles flow out well on deposition and evaporation of water on baking to form smooth and continuous films. Molecular weight is lower than in emulsion polymerization, 10,000 – 50,000 as noted hereinbefore.

The dispersions of this invention are useful without modification, forming continuous films which are more flexible and impact resistant than films of solution copolymers from the same monomers, this improvement being based on the increased molecular weight obtained herein. With usual monomer balances, the films are relatively soft and highly flexible, but monomer selection can be used to provide harder polymers of higher glass transition temperature. In normal practice in this invention, monomers are selected to provide a glass transition temperature of at least about 30°F. Also, a water dispersible aminoplast resin is preferably added to the dispersions of this invention, providing a curing potential for the formation of films of increased hardness and solvent resistance. Smaller proportions of the aminoplast resin are needed for cure herein than are required for solution copolymers, probably because of the higher molecular weight which is obtained from the dispersion polymerization.

Referring more particularly to the low molecular weight polyhydric alcohols which may be utilized in accordance with the invention, any organic polyhydric alcohol may be utilized having a molecular weight up to about 6000. There is no lower limit of molecular weight since ethylene glycol, the lowest molecular weight polyhydric alcohol, is useful herein. The preferred polyhydric alcohols are aliphatic polyethers and these preferably have an hydroxyl functionality of from about 2 to about 4, though higher functional polyhydric alcohols, such as sorbitol, are also useful, though less preferred. The polyhydric alcohols which may be utilized in this invention are further illustrated by diethylene glycol, triethylene glycol, tetraethylene glycol, propylene glycol, dipropylene glycol, polypropylene glycol 425, polypropylene glycol 1025, polypropylene glycol 2025, hexylene glycol, 2-methyl-2-ethyl-1,3-propanediol, 2-ethyl-1,3-hexanediol, 1,5-pentanediol, glycerine, 1,2,6-hexanetriol, thiodiglycol, and esterdiol having the formula $HOCH_2C(CH_3)_2—CH_2OCOC(CH_3)_2—CH_2OH$.

Preferred polyhydric alcohols are those having higher functionality such as glycerine, and pentaerythritol and polyethers based thereon as by the reaction of ethylene oxide or propylene oxide with the trihydric or tetrahydric alcohol. Particularly preferred products are polyether derivatives of glycerine, trimethylol propane, hexanetriol, or pentaerythritol having a molecular weight in the range of from 300 to 5000.

While entirely organic polyhydric alcohols are preferred, part of the molecule may be inorganic as, for example, polyhydric alcohols produced by reaction of a monoepoxide such as ethylene oxide or propylene oxide with phosphoric acid or benzene phosphonic acid, or polyhydric alcohols produced in similar fashion utilizing in the reaction one of the above-named glycols instead of all or a portion of the monoepoxide. Again, it is preferred that the polyhydric alcohol be a polyether.

It is noted in passing that surface active agents are molecules which possess a hydrophobic portion and a hydrophilic portion. Non-ionic surfactants are typified by ethylene oxide adducts of a long chain monohydric alcohol providing a molecule with a hydrophobic end, and a hydrophilic end, thereby providing a surfactant. In this invention, a polyhydric alcohol is used providing a molecule with a plurality of hydrophilic portions. As a result, the polyhydric alcohols used herein are not classified as surfactants and are not particularly adapted for such purpose.

The polyhydric alcohol referred to hereinbefore is employed in an amount of at least 0.5%, preferably at least 2%, based on the weight of the monoethylenic monomers which are to be copolymerized. These monomers are preferably free of any functional group which is reactive, under the conditions of polymerization, with the hydroxy groups in the polyhydric alcohol. Somewhat larger amounts of polyhydric alcohol can be used, e.g., 15 to 20%, and even larger amounts may be employed though this is not preferred since it is preferred to employ as little of the polyhydric alcohol component as is required to provide the liquid mixture which is employed in the polymerization process and to confer the stability in water dispersion which is ultimately desired. From 3–12% of polyhydric alcohol represents preferred practice, and up to about 50% is broadly tolerable.

In this invention, the monoethylenic monomers are combined with the polyhydric alcohol to form a liquid mixture. The liquid nature of the mixture permits the same to be broken up by agitation with water in the reactor to thereby obtain the desired particle size, e.g., 0.5–5 micron. It will be appreciated that some of the monoethylenic monomers are themselves liquid, such as styrene, and the use of liquid monomer eases the burden of obtaining the desired liquid mixture. Also, the fact of dissolution is measured at polymerization temperature so that monomers like fumaric acid, which is poorly soluble at room temperature, can be used since it dissolves in the hot aqueous system at the time of polymerization. However, the polyhydric alcohol is preferably itself liquid at room temperature.

The monoethylenic monomers which are employed are subject to wide variation, all of the monomers customarily employed in acrylic copolymers being broadly useful herein. Thus, vinyl aromatic monomers, such as styrene and homologs thereof, such as vinyl toluene are highly useful herein, it being customary to balance such monomers which provide hard copolymers when homopolymerized with alkyl acrylates and methacrylates containing 2 or more carbon atoms in the alkyl group and which provide soft polymers when homopolymerized. Among the monomers which are particularly useful herein, in addition to those noted hereinbefore, are methyl methacrylate and acrylonitrile. Esters of acrylic acid or crotonic acid are particularly desirable such as ethyl acrylate, 2-ethylhexyl acrylate, dodecyl acrylate, butyl crotonate, and the like. Up to about 20% of total monomers may be polyethylenically unsaturated polyester as disclosed in U.S. Pat. No. 3,163,615.

It is important that from 1–30%, based on the weight of polymerizable monomers, be constituted by monoethylenic carboxylic acids. These are illustrated by acrylic acid, methacrylic acid, crotonic acid, maleic acid, fumaric acid, monobutyl maleate, and the like. Preferred proportions of the monoethylenic carboxylic acid are from 3–20%, on the same basis. If the acid is omitted, stability of the dispersion during polymerization and thereafter is unsatisfactory.

Other monomers of diverse type which may be included are illustrated by 2-hydroxyethyl methacrylate, and similar hydroxy-functional monoethylenic compounds. Also, amine and amide-functional compounds may be present such as dimethyl aminoethyl methacrylate and acrylamide. The acrylamide may be methylolated if desired. While these monomers may be present, it is preferred that the carboxy group be the sole functional monomer in the copolymer and, if other functionality is present, it is desirably limited to the hydroxy group, the amido group, the methylol group, or the amino group.

Out of an abundance of caution, it is noted in passing that the hydroxy group is used herein with its normal specific meaning denoting the alcoholic OH group, and this term does not include the N-methylol group or the phenolic OH group.

The polymerization which is employed in this invention is a simple one. The liquid mixture of monomers and polyhydric alcohol is simply dispersed in water (preferably by adding the mixture in increments) with vigorous agitation and moderate heat is employed to cause a conventional free radical polymerization catalyst to release free radicals and stimulate or initiate the desired polymerization which is itself conventional. The catalyst may be benzoyl peroxide or the like dissolved in the monomers, but it is preferred to employ persulfates dissolved in the aqueous phase. Ammonium persulfate dissolved in the aqueous phase will be used to illustrate the invention. Hydrogen peroxide may also be used in the aqueous phase.

Catalyst proportion (0.1–5% of monomers) and reaction temperature (liquid phase preferably at 50°C. or higher, more usually 75–100°C) are both conventional. The polymerization is desirably carried out at a solids content of from 5–50%.

After the polymerization reaction is completed, the acidic copolymer is at least partially neutralized as previously noted. The final, at least partially neutralized copolymer dispersion desirably has a pH in the range of 5–11. Final solids are desirably in the range of 20–40% for conventional application, and from 2–20%, preferably 3–15% for electrocoating use. At a given solids content, viscosity increases with pH so partial neutralization can be used to control viscosity. At least 5% neutralization, preferably 10–30% neutralization, helps to provide minimum viscosity. More extensive neutralization is preferred for greater stability and for electrocoat application.

If the acidic copolymer includes amine functionality, the dispersion can be stabilized by at least partial neutralization with an acid such as acetic acid.

The aminoplast resins which are desirably utilized herein are those which can be stably dispersed in water. Such dispersions can be achieved in any desired manner. Thus, hexamethoxy methyl melamine is water soluble and may be used. Similarly, partially ethylated derivatives of hexamethoxy methyl melamine, while water insoluble, are stably dispersible in water, and these may also be used. Benzoguanamine-formaldehyde condensates are available in water insoluble, but water dispersible form, and these are also useful herein. Still further, aminoplast resins can be provided to include carboxyl groups which enable dispersion in water through salt formation between the carboxyl group in the aminoplast resin and a base, preferably an amine as noted hereinbefore. Products of this type are disclosed in my copending application Ser. No. 19,457, filed Mar. 13, 1970.

From the standpoint of the use of an aminoplast resin, it will be observed that the N-methoxy group contained in the aminoplast resin is reactive with the carboxyl groups of the copolymer which is stably dispersed in the aqueous medium, and it is also reactive with the hydroxy groups in the low molecular weight polyhydric alcohol. Also, and since the copolymers produced by the dispersion polymerization of this invention possess higher molecular weight than is obtainable in conventional solution copolymerization, the aminoplast resin can be utilized herein in smaller proportion. While 2–40% of the aminoplast resin, based on the total weight of resin, is broadly useful, preferred proportions are from 5–25%.

The aqueous dispersions of this invention can be applied in any desired manner, e.g., by spray, brush, roller coating or the like. Roller coating is particularly preferred since the dispersions of this invention, unlike ordinary emulsion systems, possess a greatly reduced tendency to foam, thus overcoming a major difficulty in roll coating. Also, pinholing, cratering, void formation, and the like, are greatly reduced as against the use of emulsions with surface active agents. Also, and as a result of larger particle size, the dispersions of this invention provide higher viscosity at given resin solids content in comparison with conventional emulsions so that thinner films can be easily applied. This is of especial value when it is appreciated that these thinner films provide the desired corrosion resistance which normally necessitates the deposition of much thicker films.

In addition to conventional application, the aqueous dispersions of this invention may be applied, either with or without the added aminoplast resin, by anodic electrodeposition. Thus, and by diluting the aqueous dispersion with water to 10% resin solids, coatings have been electrodeposited on aluminum employing 100 volts for 90 seconds to provide, after baking, adherent coatings having a hardness of H–2H, and being capable of withstanding 60 inch pounds of forward impact.

It is noted with respect to electrocoat application that the dispersions of this invention are adapted for use with very simple replenishment techniques, because the polymer particles in the dispersions of this invention are already stably dispersed in water. Thus, if the electrodeposition process depletes the system of resin solids, it is merely necessary to add a more concentrated dispersion and blend the same into the existing electrocoat bath with simple agitation. As a feature of this invention, effective anodic electrocoating can be carried out at a polymer acid value as low as 3, preferably from 12–30.

From the standpoint of cure, curing temperatures range from about 200° to 550°F. for periods of time ranging from about an hour at the lowest temperature to about 30 seconds at the highest temperature. Preferred baking temperatures are from 300° to 450°F.

The invention is illustrated in the following examples in which all parts are by weight.

EXAMPLE 1

Procedure of Preparation (Charge Composition)

Parts by Weight
  500 Deionized water
  0.75 Ammonium persulfate
  Charge into reactor and heat to 90°C. Then prepare a monomer premix consisting of the following:
  170 Styrene
  53 Acrylic Acid
  155 Ethyl Acrylate
  37 Polyhydric Alcohol (see note 1)
  14 Tertiary Dodecyl Mercaptan
  Then prepare a catalyst premix consisting of:
  375 Deionized Water
  3 Ammonium Persulfate
  Add the monomer premix and the catalyst premix solution to the reactor, simultaneously, over a 2½ hour period at 85°–90°C. using fast speed agitation. When addition is complete, hold temperature at 85°C. for an additional 90 minutes. Cool to 30°C. and neutralize with the following solution:
  36 Dimethyl ethanol amine
  185 Deionized water.

The final characteristics of the dispersion so-provided are as follows:

| | |
|---|---|
| Solids (percent) | 29.1 |
| Acid Value | 27.6 |
| Appearance: White-Milky Dispersion | |

Note 1 — Liquid trihydric polyoxypropylene derivative of trimethylol propane having an average molecular weight of 2540, an hydroxyl number (KOH/g.) of 63, and a viscosity at 25°C. of 440 centipoises.

EXAMPLE 2

Procedure of Preparation (Charge Composition)

Parts by Weight
  650 Deionized Water
  0.65 Ammonium Persulfate
  Charge into reactor and heat to 90°C. using fast speed agitation. Then prepare a monomer premix consisting of the following:
  240 Styrene
  28 Acrylic Acid
  50 Acrylonitrile 170 Ethyl Acrylate
50 Polyhydric Alcohol (see note 2)
Then prepare a catalyst premix consisting of:
2.5 Ammonium Persulfate
480 Deionized Water Add the monomer premix and catalyst solution, simultaneously, to reactor over a 2½ hour period at 85°–90°C. using fast speed agitation. When addition is complete, hold temperature at 85°C. for an additional 90 minutes. Cool to 30°C. and neutrlize with the following solution:
60 Dimethyl Ethanol Amine
100 Deionized Water The final characteristics of the dispersion so-provided are as follows:

| | |
|---|---|
| Solids (percent) | 28.5 |
| Acid value (non-volatile) | 51.2 |
| Appearance: Milky dispersion | |

Note 2 — Liquid trihydric polyoxypropylene derivative of trimethylol propane having an average molecular weight of 730, an hydroxyl number (KOH/g.) of 232, and a viscosity of 300 centipoises at 25°C.

EXAMPLE 3

Example 2 was repeated, only this time the polyhydric alcohol was eliminated from the monomer premix. The resulting dispersion was very seedy, and large amounts of material were deposited on the agitator, and the walls of the reactor.

Evaluation of Dispersion of Example 2

The dispersion of Example 2 was blended with water soluble hexamethoxymethyl melamine resin to provide a ratio of acrylic dispersion solids to hexamethoxymethyl melamine resin solids of 80:20. The coating composition so-provided was then applied to aluminum panels using a wound-wire rod to deposit wet coatings having a thickness of 0.5 mil. The coated panels were baked in an electric oven at 475°F. for 60 seconds to cure the same. The cured panels exhibited the following results:

| | |
|---|---|
| Pencil hardness: | H |
| Impact (forward 60 in./lb.) | Pass |
| Impact (reverse 40 in./lb.) | Pass |
| Flexibility (⅛ in. mandrel) | Excellent |
| Discoloration or Yellowing | None |
| Solvent Resistance - Pass 30 methyl ethyl ketone rubs. | |

EXAMPLE 4

Preparation of Acrylic-Melamine Dispersion for Electrocoating

An acrylic dispersion was prepared and modified with 25% (based on resin solids) of a water dispersible partially ethylated methylated hexamethylol melamine. American Cyanamid product XM-1116 is a commercial product which may be used.

The details of preparation are as follows:

Charge Composition — Parts by Weight 650 deionized water
0.65 Ammonium persulfate Charge to reactor and heat to 90°C. Then prepare a monomer premix consisting of the following:
240 Styrene
50 Polyhydric Alcohol (see note 1)
30 Acrylic Acid
220 Ethyl Acrylate
Then prepare a catalyst premix consisting of:
480 Deionized water
2.5 Ammonium Persulfate Add the monomer premix and the catalyst premix solution to the reactor, simultaneously, over a 2½ hour period at 90°C. When addition is complete, hold temperature at 90°C. for 1½ hours. Cool to 30°C. and neutralize with the following solution:
60 Dimethyl Ethanol Amine
100 Deionized water Then add the following to provide the final dispersion:
180 Partially ethylated methylated hexamethylol melamine
120 2-Butoxy Ethanol
100 Deionized Water The dispersion was diluted to 10% solids with water and passed through an anionic ion exchange column to remove water soluble salts (residue from ammonium persulfate catalyst) to form an electrocoat bath.

Coatings have been anodically electrodeposited on aluminum panels immersed in the bath employing 100 volts direct current for 60 seconds to provide, after baking, adherent films having a hardness of H–2H and which are able to withstand 60 inch pounds of forward impact.

The invention is defined in the claims which follow.
I claim:

1. An aqueous dispersion of copolymer particles having molecular weight in the range of from 10,000–50,000 and which is stable in the absence of emulsifying agent and which comprises copolymer particles of from about 1 to about 30% by weight of monoethylenic carboxylic acid and at least one copolymerizable monoethylenic monomer, said particles having an average diameter in the range of 0.5–5 microns and said particles containing from 2% up to about 50%, based on the monoethylenic monomers, of trihydric or tetrahydric polyhydric alcohol having a molecular weight up to about 6000, said copolymer particles being at least partially neutralized, and said dispersion having incorporated therein from 2–40%, based on the total weight of resin, of a water-dispersible aminoplast resin.

2. A dispersion as recited in claim 1 in which said copolymer has a Tg of at least about 30°F.

3. A dispersion as recited in claim 1 in which said copolymer particles are neutralized with an amine to provide a pH in the range of 5–11.

4. A dispersion as recited in claim 1 in which said dispersion includes a volatile organic solvent in an amount up to about 10%, based on the weight of the copolymer.

5. An aqueous electrocoating bath containing the dispersion of claim 1 at a solids content in the range of 2–20%.

6. An aqueous dispersion as recited in claim 1 in which said polyhydric alcohol is aliphatic.

7. An aqueous dispersion as recited in claim 1 in which said mixture of monomers consists essentially of styrene or vinyl toluene in admixture with alkyl ester of monoethylenic monocarboxylic acid containing 2 or more carbon atoms in the alkyl group, and from 3–20% of monoethylenic carboxylic acid, said monomers providing a $T_g$ of at least about 30°F.

8. An aqueous dispersion of copolymer particles in water having molecular weight in the range of from 10,000–50,000 and which is stable in the absence of emulsifying agent, and which is produced by forming a liquid mixture consisting of monoethylenic monomers and from 2% up to about 20%, based on the weight of said monomers, of trihydric or tetrahydric aliphatic polyhydric alcohol having a molecular weight in the range of from 300 to 5000, said monomers providing a $T_g$ of at least about 30°F. and including from 3 to 20% by weight of monoethylenic carboxylic acid, dispersing said mixture in water to form a dispersion, said dispersion including a free radical polymerization catalyst, subjecting the dispersed liquid mixture in said dispersion containing the said catalyst to agitation at an elevated polymerization temperature, with said monomers being in solution in a liquid mixture containing said polyhydric alcohol, until polymerization of said monomers has been completed, and then at least partially neutralizing the acid content of the copolymer particles which are formed with a base, and then adding to said dispersion from 2–40%, based on the total weight of resin, of a water dispersible aminoplast resin.

* * * * *